US008100178B2

(12) United States Patent
Bragg et al.

(10) Patent No.: US 8,100,178 B2
(45) Date of Patent: Jan. 24, 2012

(54) METHOD OF OIL RECOVERY USING A FOAMY OIL-EXTERNAL EMULSION

(75) Inventors: James R. Bragg, Houston, TX (US); Robert D. Kaminsky, Houston, TX (US); Sergio A. Leonardi, Pearland, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 633 days.

(21) Appl. No.: 12/086,313

(22) PCT Filed: Oct. 17, 2006

(86) PCT No.: PCT/US2006/040661
§ 371 (c)(1),
(2), (4) Date: Feb. 18, 2009

(87) PCT Pub. No.: WO2007/078379
PCT Pub. Date: Jul. 12, 2007

(65) Prior Publication Data
US 2009/0211758 A1   Aug. 27, 2009

Related U.S. Application Data

(60) Provisional application No. 60/753,160, filed on Dec. 22, 2005.

(51) Int. Cl.
*E21B 43/16* (2006.01)
(52) U.S. Cl. ............... 166/275; 166/270; 166/270.1
(58) Field of Classification Search .............. 166/275, 166/268, 401, 270, 270.1, 272.4
See application file for complete search history.

(56) References Cited

U.S. PATENT DOCUMENTS

| | | | |
|---|---|---|---|
| 2,241,273 A | 5/1941 | Robinson et al. ............ 255/1 |
| 2,300,590 A | 11/1942 | O'Brien ............ 252/8.5 |
| 2,996,450 A | 8/1961 | Zech et al. ............ 252/8.5 |
| 3,108,441 A | 10/1963 | Watson ............ 61/36 |
| 3,149,669 A | 9/1964 | Binder, Jr. et al. ............ 166/9 |
| 3,208,515 A | 9/1965 | Meadors ............ 166/9 |
| 3,330,348 A | 7/1967 | Hardy et al. ............ 166/10 |
| 3,356,138 A | 12/1967 | Davis, Jr. et al. ............ 166/9 |
| 3,380,531 A | 4/1968 | McAuliffe et al. ............ 166/45 |
| 3,386,514 A | 6/1968 | Weber ............ 166/42 |
| 3,412,792 A | 11/1968 | Parker et al. ............ 166/9 |
| 3,443,640 A | 5/1969 | Klein ............ 166/294 |
| 3,472,319 A | 10/1969 | McAuliffe ............ 166/270 |
| 3,490,471 A | 1/1970 | Carlin ............ 137/13 |
| 3,509,951 A | 5/1970 | Enochs ............ 175/70 |
| 3,630,593 A | 12/1971 | Bartelt et al. ............ 350/3.5 |
| 3,707,459 A | 12/1972 | Mason et al. ............ 208/76 |
| 3,721,295 A | 3/1973 | Bott ............ 166/295 |
| 3,749,171 A | 7/1973 | Marx ............ 166/274 |
| 3,796,266 A | 3/1974 | Carlin et al. ............ 166/305 |
| 3,804,760 A | 4/1974 | Darley ............ 252/8.5 |
| 3,818,989 A | 6/1974 | Christopher, Jr. et al. ..... 166/274 |
| 3,866,680 A | 2/1975 | Dauben ............ 166/273 |
| 3,915,920 A | 10/1975 | Slovinsky et al. ............ 206/29.6 |
| 3,929,190 A | 12/1975 | Chang et al. ............ 166/274 |
| 3,965,986 A | 6/1976 | Christopher ............ 166/292 |
| 3,980,136 A | 9/1976 | Plummer et al. ............ 166/280 |
| 3,996,180 A | 12/1976 | Kane ............ 260/29.6 |
| 4,011,908 A | 3/1977 | Holm ............ 166/273 |
| 4,012,329 A | 3/1977 | Hayes et al. ............ 252/8.5 |
| 4,034,809 A | 7/1977 | Phillips et al. ............ 166/270 |
| 4,083,403 A | 4/1978 | Carlin et al. ............ 166/252 |
| 4,085,799 A | 4/1978 | Bousaid et al. ............ 166/272 |
| 4,096,914 A | 6/1978 | McLaughlin et al. ......... 166/307 |
| 4,100,966 A | 7/1978 | Bousaid ............ 166/273 |
| 4,163,476 A | 8/1979 | Tate ............ 166/271 |
| 4,192,753 A | 3/1980 | Pye et al. ............ 252/8.5 |
| 4,200,151 A | 4/1980 | Tate ............ 166/271 |
| 4,216,828 A | 8/1980 | Blair ............ 166/274 |
| 4,219,082 A | 8/1980 | Kalfoglou ............ 166/273 |
| 4,233,165 A | 11/1980 | Salathiel et al. ............ 252/8.55 |
| 4,248,304 A | 2/1981 | Phillips ............ 166/300 |

(Continued)

FOREIGN PATENT DOCUMENTS

CA    849884    8/1970    ............ 166/33

(Continued)

OTHER PUBLICATIONS

Bragg, J. R. et al., "Recent Applications of the Single Well Tracer Method for Measuring Residual Oil Saturation," SPE of AIME, Mid-Continent Section, Improved Oil Recovery Symposium Preprint, (Tulsa, OK, Mar. 22-24, 1976) No. SPE-5805, pp. 103-113.

(Continued)

*Primary Examiner* — Brad Harcourt
(74) *Attorney, Agent, or Firm* — ExxonMobil Upstream Research Company Law Department

(57) ABSTRACT

An improved method of producing hydrocarbons from a subterranean formation in which a solids-stabilized emulsion (SSE) is formed, the SSE comprising oil as a first liquid, droplets of a second liquid suspended in the oil, and solid particles that are insoluble in both the oil and the second liquid at the conditions of the subterranean formation. The SSE with dissolved gas is injected into the subterranean formation as a drive fluid, and at least a portion of the SSE is placed into one or more area of the subterranean formation having an in situ pressure sufficiently lower than the selected partial pressure to permit evolution of at least a portion of the gas from the oil. Furthermore, a method of making the foamy SSE is also provided.

19 Claims, No Drawings

U.S. PATENT DOCUMENTS

| | | | |
|---|---|---|---|
| 4,274,956 A | 6/1981 | Stewart | 210/638 |
| 4,276,935 A | 7/1981 | Hessert et al. | 166/295 |
| 4,282,928 A | 8/1981 | McDonald et al. | 166/274 |
| 4,298,455 A | 11/1981 | Huang | 208/48 |
| 4,359,391 A | 11/1982 | Salathiel et al. | 252/8.55 |
| 4,384,997 A | 5/1983 | Detroit | 260/124 |
| 4,391,925 A | 7/1983 | Mintz et al. | 523/130 |
| 4,411,770 A | 10/1983 | Chen et al. | 208/111 |
| 4,475,594 A | 10/1984 | Drake et al. | 166/294 |
| 4,488,602 A | 12/1984 | Lepper | 166/274 |
| 4,505,828 A | 3/1985 | Lipowski et al. | 252/8.5 |
| 4,525,285 A | 6/1985 | Son et al. | 252/8.5 |
| 4,592,830 A | 6/1986 | Howell et al. | 208/94 |
| 4,659,453 A | 4/1987 | Kukes et al. | 208/108 |
| 4,705,110 A | 11/1987 | Balzer | 166/274 |
| 4,706,749 A | 11/1987 | Hayes et al. | 166/267 |
| 4,732,213 A | 3/1988 | Bennett et al. | 166/262 |
| 4,741,401 A | 5/1988 | Walles et al. | 166/300 |
| 4,780,243 A | 10/1988 | Edgley et al. | 252/307 |
| 4,790,382 A | 12/1988 | Morrow et al. | 166/274 |
| 4,856,588 A | 8/1989 | Borchardt | 166/273 |
| 4,888,108 A | 12/1989 | Farnand | 208/424 |
| 4,966,235 A | 10/1990 | Gregoli et al. | 166/267 |
| 5,031,698 A | 7/1991 | Borchardt et al. | 166/272 |
| 5,080,809 A | 1/1992 | Stahl et al. | 252/8.554 |
| 5,083,613 A | 1/1992 | Gregoli et al. | 166/275 |
| 5,095,986 A | 3/1992 | Naae et al. | 166/274 |
| 5,145,012 A * | 9/1992 | Hutchins et al. | 166/292 |
| 5,294,353 A | 3/1994 | Dill | 252/8.553 |
| 5,302,293 A | 4/1994 | Kaplan et al. | 210/701 |
| 5,350,014 A | 9/1994 | McKay | 166/263 |
| 5,360,558 A | 11/1994 | Pakulski et al. | 252/8.551 |
| 5,373,901 A | 12/1994 | Norman et al. | 166/300 |
| 5,424,285 A | 6/1995 | Stacy et al. | 507/202 |
| 5,490,940 A | 2/1996 | Bragg et al. | 210/671 |
| 5,499,677 A | 3/1996 | Cowan | 166/293 |
| 5,603,863 A | 2/1997 | Dahms | 252/302 |
| 5,627,143 A | 5/1997 | Sawdon | 507/103 |
| 5,780,395 A | 7/1998 | Sydansk | 507/202 |
| 5,820,750 A | 10/1998 | Blum et al. | 208/263 |
| 5,834,406 A | 11/1998 | Sydansk | 507/202 |
| 5,836,390 A | 11/1998 | Apps et al. | 166/281 |
| 5,855,243 A | 1/1999 | Brag | 166/275 |
| 5,910,467 A | 6/1999 | Bragg | 507/202 |
| 5,927,404 A | 7/1999 | Bragg | 166/275 |
| 5,942,469 A | 8/1999 | Juprasert et al. | 507/202 |
| 5,948,242 A | 9/1999 | Ohsol et al. | 208/187 |
| 5,964,906 A | 10/1999 | Layrisse et al. | 44/302 |
| 5,985,177 A | 11/1999 | Yoshida et al. | 252/309 |
| 6,022,471 A | 2/2000 | Wachter et al. | 208/120 |
| 6,035,933 A | 3/2000 | Khalil et al. | 166/263 |
| 6,059,036 A | 5/2000 | Chatterji et al. | 166/294 |
| 6,068,054 A | 5/2000 | Bragg | 166/270 |
| 6,069,178 A | 5/2000 | Layrisse et al. | 516/50 |
| 6,105,672 A | 8/2000 | Deruyter et al. | 166/270.1 |
| 6,162,766 A | 12/2000 | Muir et al. | 507/267 |
| 6,225,262 B1 | 5/2001 | Irwin et al. | 507/203 |
| 6,227,296 B1 | 5/2001 | Reppert et al. | 166/305.1 |
| 6,284,714 B1 | 9/2001 | Bland | 507/100 |
| 6,291,406 B1 | 9/2001 | Rose et al. | 507/239 |
| 6,302,209 B1 | 10/2001 | Thompson, Sr. et al. | 166/305.1 |
| 6,325,147 B1 | 12/2001 | Doelier et al. | 166/252.1 |
| 6,410,488 B1 | 6/2002 | Fefer et al. | 507/103 |
| 6,524,468 B2 | 2/2003 | Varadaraj et al. | 208/5 |
| 6,544,411 B2 | 4/2003 | Varadaraj | 208/265 |
| 6,569,815 B2 | 5/2003 | Varadaraj | 507/269 |
| 6,632,778 B1 | 10/2003 | Ayoub et al. | 507/202 |
| 6,716,282 B2 | 4/2004 | Griffith et al. | 106/705 |
| 6,734,144 B2 | 5/2004 | Varadaraj et al. | 507/103 |
| 6,800,193 B2 | 10/2004 | Varadaraj | 208/106 |
| 6,988,550 B2 | 1/2006 | Bragg et al. | 166/275 |
| 7,033,975 B2 | 4/2006 | Baran, Jr. et al. | 507/102 |
| 7,121,339 B2 | 10/2006 | Bragg et al. | 166/275 |
| 7,186,673 B2 | 3/2007 | Varadaraj et al. | 507/200 |
| 7,338,924 B2 | 3/2008 | Varadaraj | 507/263 |
| 2004/0122111 A1 * | 6/2004 | Varadaraj et al. | 516/21 |
| 2006/0084581 A1 | 4/2006 | Bragg et al. | 507/269 |

FOREIGN PATENT DOCUMENTS

| | | |
|---|---|---|
| CA | 2044473 | 12/1992 |
| EP | 0 130 632 B1 | 8/1987 |
| EP | 0 175 511 | 1/1988 |
| RU | 2057914 C1 | 4/1996 |
| SU | 1682539 A1 | 11/1989 |
| SU | 1796013 A3 | 2/1993 |
| WO | WO-95/15812 A1 | 6/1995 |
| WO | WO-95/23909 | 9/1995 |
| WO | WO-98/53181 A1 | 11/1998 |
| WO | WO-01/81502 A2 | 11/2001 |
| WO | WO-01/81502 A3 | 11/2001 |
| WO | WO-01/81718 | 11/2001 |
| WO | WO-01/83637 A1 | 11/2001 |
| WO | WO-01/83942 A1 | 11/2001 |
| WO | WO-03/057783 A1 | 7/2003 |
| WO | WO-03/100214 A1 | 12/2003 |

OTHER PUBLICATIONS

Bragg, J. R. et al., "Loudon Surfactant Flood Pilot—Overview and Update," $3^{rd}$ SPE of AIME Middle East Oil Show Conf. (Bahrain, Mar. 14-17, 1983) Proc., pp. 525-536 (SPE11505).

Bragg, J. R. et al., "Measuring Well Injection Profiles of Polymer-Containing Fluids," $3^{rd}$ Joint SPE/DOE Enhanced Oil Recovery Symposium (Tulsa, Apr. 4-7, 1982) Proc., pp. 953-962 (1982) (SPE/DOE 10690).

Bragg, J. R. et al., "Loudon Surfactant Flood Pilot Test," $3^{rd}$ Joint SPE/DOE Enhanced Oil Recovery Symposium (Tulsa, Apr. 4-7, 1982) Proc., pp. 933-952 (SPE/DOE 10862).

Bragg, J. R., "In Situ Measurement of Residual Oil Saturation," $23^{rd}$ Annual Southwestern Petroleum Short Course Assoc. Mtg., Texas Tech University, Lubbock, TX, Apr. 22-23, 1976 Proc. pp. 183-189.

Bragg, J. R. et al., "Control of Xanthan-Degrading Organisms in the Loudon Pilot: Approach, Methodology, and Results," $58^{th}$ Annual SPE of AIME Tech. Conf. (San Francisco Oct. 5-8, 1983) Preprint No. SPE 11989, 12 pages (1983).

Broz, J.S., French, T.R., and Carroll, H. B. "Blocking of High Permeability Zones in Steamflooding by Emulsions", Third International Conference on Heavy Crude and Tar Sands, (New York City, Jul. 22-31, 1985) vol. 1, pp. 443-451.

Chen, Techlen; Chakrabarty, Tapan; Cullen, Malcolm P.; Thomas, Ray R; and Sieben, Michelle C. "Laboratory and Field Evidence of Emulsion Flow in Porous Media", CIM/AOSTRA 1991 Technical Conference, (Banff, Alberta, Canada, Apr. 21-24, 1991) Paper No. CIM/AOSTRA 91-78, pp. 78 1 to 78-14.

Civan, F. et al., "Characterization of Corrosion-Inhibiting Emulsions for Continuous Well Treatment," SPE International Oilfield Symposium, Houston, Texas, Feb. 16-19, 1999, SPE 50719, pp. 191-206, (1999).

Civan, F. and Weers, Jerry J., "Laboratory and Theoretical Evaluation of Corrosion-Inhibiting Emulsions," SPE Production & Facilities vol. 16 (4), pp. 260-266 (2001) (SPE 74271).

Chung, Keng H. and Butler, Roger M. "In-Situ Emulsification by the Condensation of Steam in Contact With Bitumen", 39th Annual Technical Meeting of the Petroleum Society of CIM (Calgary, Canada, Jun. 12-16, 1988) Paper No. 88-39-1c8 pp. 18-1 to 18 17.

Czarnecki, J. et al., "Emulsion Studies Associated with Bitumen Recovery from Canadian Oil Sands: Part I," AICHE Spring Nat. Mtg. (Mar. 10-14, 2002) (Abstract Only).

Des Brisay et al., "Pumping Heavy Oils With the Aid of Downhole Oil-In-Water Emulsification," $38^{th}$ Annual CIM Petroleum Soc. Tech. Mtg. (Calgary, Canada, Jun. 7-10, 1987), Preprints V. 1, pp. 297-309 (1987) (Paper No. 87-38-16).

Dieken, F.P, Skinner, F.W., Wharmby, A.W., and Wu, S. "Methods Manual for Chemical Analysis of Water and Wastes", Alberta Research Council (Updated Oct. 1, 1996) pp. 1-4.

De Vries, A.S. and Wit, K.; Rheology of Gas/Water Foam in the Quality Range Relevant to Steam Foam; SPE 18075 presented at the SPE Annual Technical Conference & Exhibition, Houston, TX, Oct. 2-5, 1988.

Dotson, C., Huff and R., Haskin, S. R., "Report on the Start-up of a Unique Hydrocyclone-Based System for Treating Produced Water", Produced Water 2, Plenum Press, pp. 431-445, (1996).

Farrell, James and Marsden, Jr., S. S., "Foam and Emulsion Effects on Gas Driven Oil Recovery," SUPRI-TR-62, DOE/BC/14126-3, Performed Under Contract No. FG19-87BC14126 and AC03-81SF11564 (Nov. 1988).

Felian, B. et al., "Investigation of Crude Oil-Water Emulsions in Presence of Non-Ionic Surfactants, I. Behavior of Emulsions at Room Temperature and in Ion-Free systems", Acta Physica et Chemica, v 29 (3-4), pp. 223-232, (1983).

Felian, B. et al., "Investigation of Crude Oil-Water Emulsions in Presence of Non-Ionic Surfactants, II. Behavior of Emulsions at Elevated Temperatures, and Emulsification of Crude Oil Fractions", Acta Physica et Chemica, v 30 (3*4), pp. 183-192, (1984).

Fiori, Marco and Farouq Ali, S.M. "Optimal Emulsion Design for the Recovery of a Saskatchewan Crude", 40th Annual Technical Meeting of the Petroleum Society of CIM (Banff, Alberta, Canada, May 28-31, 1989) Paper No. 89-40-43, pp. 43-1 to 43-28.

French, T. R. et al., "Use of Emulsion for Mobility Control During Steamflooding," $56^{th}$ Annu SPE Calif Reg Mtg (Oakland, Calif, Apr. 2-4, 1986) Proc V. 1 pp. 43-54 (1986) (SPE-15052).

Fraim, M.L., and Moffitt, P.D.; "Laboratory Testing and Simulation Results for High Pressure Air Injection in a Waterflooded North Sea Oil Reservoir"; SPE 38905 presented at the SPE Annual Technical Conference & Exhibition, San Antonio, TX, Oct. 5-8, 1997; pp. 655-662.

Friesen, W.I. and Levine, S. "Electrostatic Interaction between Two Water-in-Oil Emulsion Droplets in an Electric Field", Journal of Colloid and Interface Science, Vol. 150 No. 2 (May 1992) pp. 517-527.

Garthoffner, E. H., "The Role of Oil-in-Water Emulsions in Thermal Oil Recovery Processes", SPE of AIME California Regional Meeting, (Ventura, CA, Apr. 18-19, 1979).SPE 7952, 8 pp.

Gorbunov, A. T. et al., "In Situ Emulsification During Thermocaustic Flooding," Neft Khoz No. 7, pp. 42-45, (Jul. 1984) (Abstract only).

Hall, B. E. and Lasater, R. M., "Surfactants for Well Stimulation", $159^{th}$ Natl. American Chemical Society Meeting, (Feb. 1970).

Heathman, James et al., "New Test Procedures Optimize Surfactant Blends", Oil & Gas Journal v. 97 (40), pp. 71-74, (Oct. 4, 1999).

Henry, Deborah and Fuhr, Bryan, "Preparation of Bitumen from Oil Sand by Ultracentrufigation," Fuel, vol. 71(12), 1515-18 (Dec. 1992).

Humenick, Michael J. et al., "High Rate Filtration of Solids-Stabilized Oil-In-Water Emulsions," Technical Report CRWR-105, EHE-73-06, University of Texas, Austin (Dec. 1973).

Johns, R.T., et al.; Abstract: "Improved Displacement and Sweep Efficiency in Gas Flooding"; Center for Petroleum & Geosystems Engineering, Reservoir Engineering; The University of Texas at Austin; web page http://www.cpge.utex.edu/re/gas_flooding.html; updated May 5, 2003; printed Aug. 10, 2006; 2 pp.

Kimmel, T. B., "Heavy Oil Emulsion Treating in Canada," $3^{rd}$ Int'l Unitar/UNDP Heavy Crude & Tar Sands Conf. (Long Beach Calif., Jul. 22-31, 1985) Preprints V. 4, pp. 1970-1979 (1985) (Paper No. HCTS/CF 3/15 6).

Leuchenberg, C., et al.; "Development and Performance of Surface Equipment for High Temperature Underbalance Drilling in a Sour, Severely Under Pressured Formation"; ETCE99-6618 ASME Energy Sources Technology Conference & Exhibition; 14 pp.

Levine, S. and Bowen, B.D. "Capillary interaction of spherical particles adsorbed on the surface of an oil/water droplet stabilized by the particles. Part I", Colloids and Surfaces, 59 (1991) pp. 377-386.

Levine, S. and Bowen, B.D. "Capillary interaction of spherical particles adsorbed on the surface of an oil/water droplet stabilized by the particles. Part II", Colloids and Surfaces, 65 (1992) pp. 273-286.

Mendoza, Humberto, Thomas, Sara, and Farouq Ali, S.M. "Effect of Injection Rate on Emulsion Flooding for a Canadian and a Venezuelan Crude Oil", CIM/AOSTRA 1991 Technical Conference (Banff, Alberta, Canada, Apr. 21-24, 1991) Paper No. CIM/AOSTRA 91-26, pp. 26-1 to 26-6.

Menon, V.B. and Wasan, D.T. "Characterization of Oil—Water Interfaces Containing Finely Divided Solids with Applications to the Coalescence of Water in Oil Emulsions: A Review", Colloids and Surfaces, 29 (1988) pp. 7-27.

Mikula, R.J., Munoz, V.A., and Lam, W.W. "Microscopic Characterization of Emulsion Interfaces", 1989 Eastern Oil Shale Symposium (Nov. 15-17, 1989) Institute for Mining and Minerals Research, University of Kentucky, pp. 287-292.

Pal, R. et al., "Rheology of Clay-in-Oil Suspensions with Added Water Droplets," Chemical Engineering Science, vol. 47, No. 5, pp. 967-970 (Apr. 1992).

Price-Smith, C. et al., "Laboratory Development of a Novel, Synthetic Oil-Based Reservoir Drilling and Gravel-Pack Fluid System that Allows Simultaneous Gravel-Packing and Cake-Cleanup in Open-Hole Completions", SPE Asia Pacific Oil & Gas Conference, Brisbane, Australia, Oct. 16-18, 2000, SPE64399, 6 pages.

Pruess, K. and Wu, Y.S.; "On PVT—Data, Well Treatment, and Preparation of Input Data for an Isothermal Gas-Water-Foam Version of MULKOM"; prepared for Gas Research Institute GRI Contract No. 5086-271-1160; Aug. 1988; 42 pp.

Rege, S.D. and Fogler, H.S. "A Network Model for Deep Bed Filtration of Solid Particles and Emulsion Drops", AIChE Journal, vol. 34, No. 11 (Nov. 1988) pp. 1761-1772.

Reilly, B.T., and Scott, G.R.; "Cold Lake Project Recovery and the Role of Foamy Emulsion"; SPE 30287 presented at the International Heavy Oil Symposium; Calgary, Alberta, Canada; Jun. 19-21, 1995; pp. 403-441.

Reppert, T. R. et al., "Second Ripley Surfactant Flood Pilot Test," $7^{th}$ SPE/DOE Enhanced Oil Recovery Symposium (Tulsa, OK, Apr. 22-25, 1990) Proc., pp. 463-474 (1990) (SPE/DOE-20219).

Rossen, W.R.; Fundamental Process web page; Center for Petroleum & Geosystems Engineering; The University of Texas at Austin; printed Jul. 17, 2003 from http://www.cpge.utexas.edu/fp; 3 pp.

Rossen, W.; Development of More-Efficient Gas Flooding Applicable to Shallow Reservoirs/Mega PRDA Breakout; Project Fact Sheet from the U.S. Dept. of Energy, Office of Fossil Energy; printed Jul. 17, 2003 from http://dominoweb.fossil.energy.gov; 3 pp.

Sarbar, M. et al., "The Effect of Chemical Additives on the Stability of Oil-In-Water Emulsion Flow Through Porous Media", $38^{th}$ Annu CIM Petrol Soc Tech Mtg (Calgary, Canada, Jun. 7-10, 1987) Preprints V. 2, pp. 431-453 (1987) (Paper No. 87-38-25).

Sarma, H. K. et al., "Evaluation of Emulsified Solvent Flooding for Heavy Oil Recovery," $46^{th}$ Annu CIM Petrol Soc Mtg (Banff, Canada, May 14-17, 1995) Proc V.2, Paper No. CIM 95-66 (1995).

Schramm; L.L.; "Foams Can Be Effective in the Presence of Oil!"; printed from Laurie's Colloid & Interface Science Page sponsored by the University of Calgary; http://www.ucalgary.ca; copyrighted 1996.

Soo, H., Williams, M.C., and Radke, C.J. "A Filtration Model for the Flow of Dilute, Stable Emulsions in Porous Media-II. Parameter Evaluation and Estimation", Chemical Engineering Science, vol. 41, No. 2 (1986) pp. 273-281.

Sundstrom, Donald W. and Klei, Herbert E. "Wastewater Treatment", Depart. of Chemical Engineering, The University of Connecticut (1979) pp. 10-13.

Takamara, K. and Chow, R., "The Stability of Bitumen Emulsion", Energy Processing/Canada, pp. 29-31, (Sep.-Oct. 1982).

Thomas, F. Brent et al., "Water Shutoff Treatments—Reduce Water and Accelerate Oil Production", Paper No. 98-47, 49th Annual Technical Meeting of the Petroleum Society of CIM, Calgary, Alberta, Canada, Jun. 8-10 (1998).

Thompson, D. G. et al., "Emulsification and demulsification related to crude oil production," Colloids and Surfaces, vol. 15 (3-4) pp. 175-189 (1985).

Tronov, V.P. and Shireyev, a.I. "Effect of Desalinization of Stratal Water on Rheological and Demulsification Properties of Forming Emulsions", Tatar Scientific Research and Planning Institute of the Petroleum Industry (1991).

Yan, N. et al., "On water-in-oil emulsions stabilized by fine solids," Colloids and Surfaces, A: Physicochemical and Engineering Aspects, vol. 193, pp. 97-107 (2001).

Yan, Zhoulin et al., "Roles of Various Bitumen Components in the Stability of Water-in-Diluted-Bitumen Emulsions," J. Colloid and Interface Science, vol. 220, pp. 329-337 (1999).

Yang; S.H. and Reed, R.L.; Mobility Control Using $CO_2$ Forms; SPE 19689 presented at the $64^{th}$ Annual Technical Conference & Exhibition, San Antonio, TX, Oct. 6-11, 1989; pp. 603-618.

Yeung, K. "Mobility Control By Emulsions Under Bottom Water Conditions," Alberta University, MS Thesis, 1991, Masters Abstr Int V 30, No. 4, p. 1472, Winter (1992). (Abstract Only).

Yuan, F. and Pal, R. "Composition Measurement of Emulsions and Emulsions With Added Solids Using a Microwave Technique", Sixth Petroleum Conference of the Petroleum Society of CIM, (Regina, Canada, Oct. 16-18, 1995) Paper No. 95-148, pp. 1-15.

Zhou, Z. A. et al., "Interaction of Ionic Species and Fine Solids with a Low Energy Hydrophobic Surface from Contact Angle Measurement," Journal of Colloid and Interface Science, vol. 204, pp. 342-349 (1998).

Foam and Conformances Technologies home page sponsored by the Colorado School of Mines; May 1996; printed Jul. 17, 2003 from http://www.mines.edu/research/fact; 7 pp.

International Preliminary Examination Report mailed Mar. 23, 2004 for Intl. Application No. PCT/US02/39949, filed on Dec. 13, 2002, 21 pages.

* cited by examiner

METHOD OF OIL RECOVERY USING A FOAMY OIL-EXTERNAL EMULSION

This application is the National Stage of International Application No. PCT/US06/040661 filed 17 Oct. 2006, which claims the benefit of U.S. Provisional Application No. 60/753,160, filed 22 Dec. 2005.

Reference is hereby made to technically related U.S. Pat. No. 6,988,550, entitled "Solids-stabilized Oil-in-Water Emulsion and a Method for Preparing Same," U.S. Pat. No. 7,186,673, entitled "Stability Enhanced Water-in-Oil Emulsion and Method for Using Same," and U.S. Pat. No. 7,338,924, entitled "Oil-In-Water-In-Oil Emulsion."

TECHNICAL FIELD

Embodiments of the invention relate generally to a process for producing hydrocarbons from a subterranean formation by flooding with a foamy solids-stabilized emulsion formed in situ. In one or more specific embodiments, gas is dissolved in the emulsion and injected into the formation where reduced pressure permits the evolution of dissolved gas and in situ foam formation.

BACKGROUND

Oil is frequently recovered from subterranean reservoirs by use of flooding processes wherein a displacing fluid, such as water or gas, is injected into injection wells to drive the oil toward production wells where it is withdrawn. The mobility of fluid flowing through porous media in the subterranean formations found in such reservoirs may be defined as the ratio of relative permeability to fluid viscosity for that fluid (relative permeability/fluid viscosity). For some flooding processes, the mobility of the in-situ oil being displaced is significantly lower than that of the displacing fluid, and adverse mobility ratio causes the injected displacing fluid to finger through the oil, resulting in much of the oil being stranded and unrecovered. Hence, it is desirable that for an efficient flooding process, the injected fluid should have a composition and viscosity that maintains a lower mobility for the displacing fluid than the mobility of the oil being displaced. The mobility ratio for the flooding process is the ratio of the mobility of the displacing fluid to the mobility of the oil being displaced (mobility of displacing fluid/mobility of oil). A favorable mobility ratio, generally considered to be a mobility ratio of 1.0 or lower, provides improved displacement efficiency.

Some flooding processes utilize foams as a displacing fluid. For example, U.S. Pat. No. 6,105,672 (to Deruyter et al.) discloses an enhanced (WAG type) oil recovery process in an underground reservoir that uses forced injection, through one or more wells, alternately of fluid slugs and gas slugs, and recovery, through one or more production wells, of petroleum fluids displaced by the wetting fluid and the gas injected. The process is said to include dissolving a pressurized gas in the liquid of certain slugs and, after injection, relieving the pressure prevailing in the reservoir so as to generate gas bubbles by nucleation in the smallest pores, which is said to have the effect of driving the oil away from the less permeable zones into the more permeable zones (with large pores or with fractures) where the oil is swept by the gas slugs injected later on. Implementation of the process is said to considerably increase the oil recovery ratio that is usually reached with WAG type processes. According to one embodiment, at least one of the wetting liquid slugs injected during the injection stage comprises water to which foaming agents or surfactants have been added so that the pressure decrease in the reservoir generates the in-situ formation of foams.

Various other flooding processes have utilized emulsions as the displacing fluid to provide favorable mobility control and effective displacement of crude oil within the reservoir. For example, U.S. Pat. Nos. 5,855,243, 5,910,467, 5,927,404, and 6,068,054 (all to Bragg) disclose the use of solids-stabilized emulsions that provide stable and favorable mobility control for displacing crude oil. In one possible application, the emulsion comprises oil and water plus dissolved gas to reduce viscosity and is stabilized using undissolved solid particles which are at least partially oleophilic. Foams are also disclosed as special cases of emulsions, containing very high gas contents, with internal gas bubbles stabilized by interfacial films containing water, hydrocarbons, or other liquids, and stabilized by surfactants or other emulsifying agents. Noting that surfactants are often used to create stable films for creating foams, it is disclosed that stable films are to be created by mixtures of oil, water, and fine solid particles, where the solid particles interacting with the oil and water stabilize the foam film. Additions of gas to the emulsion mixture at the time that the oil, water, and solids are blended, mixed, and sheared are disclosed to permit generation of either an emulsion comprising primarily liquids with a lesser fraction of gas, or a foam comprising primarily gas, with only sufficient liquids to form a stable foam, depending on the desired properties of the final mixture. A disclosed example is when the density of a water-in-oil emulsion without included gas might be significantly greater than the density of oil to be displaced within the formation. If said emulsion without gas is injected to displace oil, it is noted that gravity underride of the oil may occur because the emulsion would tend to sink below the oil to lower portions of the formation. However, it is disclosed that sufficient gas can be included in the emulsion to cause the emulsion density under formation conditions to equal the density of the oil being displaced, thus avoiding gravity underride. Other applications of such gas-containing emulsions or foams stabilized by fine solids described in the aforementioned patents are inclusion of gas to reduce the viscosity of the injected emulsion, or inclusion of compressible gas to store energy for release as the emulsion encounters lower-pressure zones within the formation.

United States Patent Application Publication US 2003/0220204 (to Baran, Jr.) discloses the use of surface-modified nanoparticles in fluids used to recover hydrocarbon from underground formations. The use of surface-modified nanoparticles in such fluids is said to provide foams that are stable under pressure yet have a shorter foam lifetime than typical surfactant-stabilized foams after the pressure is released or lowered.

As previously noted, methods for making and using solids-stabilized oil-external emulsions for producing hydrocarbons from subterranean oil reservoirs have previously been disclosed. (See, e.g., U.S. Pat. Nos. 5,855,243, 5,910,467, and 6,068,054.) Such solids-stabilized emulsions can be used for displacing oil and maintaining mobility control during the flooding process. The overall net oil recovery resulting from the flooding process can be increased if the injected emulsions contained less oil, as would be the case if additions of gas to the emulsions were made to generate foam. In such cases, it is desirable to control the bubble size and bubble size distribution in the foam. In particular, it is desirable to maintain the average bubble size in the foam below a certain level, and also to maintain a bubble size distribution that is as uniform as possible. Accordingly, there is a need for improved methods of generating such foams while controlling bubble size and distribution. There is also a need for improved methods of producing hydrocarbons from a subterranean formation utilizing such foams.

SUMMARY

In one or more embodiments, the invention relates to a method for producing hydrocarbons from a subterranean formation in which a solids-stabilized emulsion (SSE) is formed, the SSE comprising oil as a first liquid, droplets of a second liquid suspended in the oil, and solid particles that are insoluble in both the oil and the second liquid at the conditions of the subterranean formation. The SSE is exposed to gas at a selected partial pressure of the gas so as to dissolve at least some of such gas in the oil in the SSE. An SSE having at least a portion of the gas dissolved therein is thus formed. The SSE with dissolved gas is injected into the subterranean formation as a drive fluid, and at least a portion of the SSE is placed into one or more areas of the subterranean formation having a pressure sufficiently low to permit evolution of at least a portion of the gas from the oil. Gas bubbles are thereby formed in the oil within the subterranean formation. In one or more embodiments, the gas bubbles produce a foamy solids-stabilized emulsion (foamy SSE) in situ in the formation. The foamy SSE can be used as a drive fluid to produce hydrocarbons from said subterranean formation. In one or more alternative embodiments, the invention relates to a method for making the foamy SSE. The term "foamy" in the present context refers to a liquid containing any volume of gas bubbles and not necessarily a liquid containing a majority volume fraction of undissolved gas.

In one or more additional embodiments, the invention relates to a method for producing hydrocarbons from a subterranean formation comprising forming an oil-external emulsion within the subterranean formation, the oil-external emulsion having water droplets and gas bubbles stabilized therein as internal phases, wherein the water droplets and the gas bubbles are stabilized as internal phases by sub-micron size solid particles. The oil-external emulsion thus formed in the subterranean formation is used as a drive fluid to drive the hydrocarbons toward one or more production wells, and the hydrocarbons are recovered from the subterranean formation.

In still other embodiments, the invention relates to the hydrocarbons produced by the above methods.

DETAILED DESCRIPTION

According to one or more embodiments of the present invention, a method is provided for producing hydrocarbons from a subterranean formation in which an SSE having gas bubbles therein is utilized. As used throughout this specification, including the appended claims, a solids-stabilized emulsion (SSE) means an emulsion that is at least partially stabilized by solid particles as described herein. Such SSE's will be interchangeably referred to herein as the "SSE" or as the "emulsion." Thus, the SSE's useful in embodiments of the invention may comprise other stabilizing agents, such as surfactants, in addition to the stabilizing solids. In one or more embodiments, an SSE comprising oil as a first liquid and droplets of a second liquid, for example water, suspended in the oil, is first formed. The emulsion is stabilized using undissolved ultra-fine solid particles. Methods for malting and using such solids-stabilized oil-external emulsions have been previously disclosed in, for example, U.S. Pat. Nos. 5,855,243, 5,910,467, and 6,068,054, all of which are fully incorporated herein by reference. The solid particles used in such emulsions are selected so as to be insoluble in both the oil and the second liquid at the conditions of the subterranean formation. In addition, the solid particles used may be either formation solid particles (i.e. indigenous to the subterranean formation) or non-formation solids particles (i.e., obtained outside of the subterranean formation). Non-formation solid particles may either be naturally occurring or synthetic. The average particle size of the solids is typically less than ten microns. In one or more embodiments, the particle size is about one micron or less, and in still other embodiments, the particle size is 100 nanometers or less. Particle size as used herein is defined as the maximum dimension of the particle along its x, y, and z axes as measured by an appropriate technique. Appropriate measuring techniques include scanning probe microscopy, one example of which is an atomic force microscope.

The solids useful in embodiments of the present invention also include clays, quartz, feldspar, gypsum, coal dust, asphaltenes, or polymers. Specifically, fumed silica with particle diameters of approximately 10-20 nanometers in size, or fundamental particles of exfoliating bentonite clay having thickness of approximately 1 nanometer, and widths of 100-1000 nanometers can be used.

In addition to the above, the solids used to form the SSE's of the present invention can be naturally occurring solids found in the crude oil or other hydrocarbons indigenous to the formation, such as, for example, precipitated asphaltenes. Alternatively, the solids can be naturally occurring inorganic solids such as those previously mentioned.

In one or more embodiments of the present invention, a mixture of different solids types is used to optimize stability of water droplets and gas bubbles simultaneously, with one solids type for maximizing stability of water droplets, and another type solid for maximizing stability of gas bubbles. An example of such use is a mixture of fumed silica and exfoliated bentonite.

Examples of liquids useful in the formation of the SSE's of the present invention are set forth in U.S. Pat. Nos. 5,855,243, 5,910,467, and 6,068,054. The oil that can be used can be crude oil, and as set forth in, for example U.S. Pat. No. 5,855,243. The oil should contain a sufficient amount of asphaltenes, polar hydrocarbons, or polar resins to help stabilize the solid particle-oil interaction. Preferably the SSE's oil comprises oil or other hydrocarbons previously produced from the formation where the SSE is to be used. Where the SSE oil does not contain a sufficient amount of asphaltenes or polar hydrocarbons, these substances can be added with the solids to a concentration required for stabilizing the SSE.

Water may be used as the second liquid of the SSE as described above. The water used for making the SSE also should have sufficient ion concentration to keep the emulsion stable under formation conditions. Preferably, formation water is used to make the SSE. However, fresh water could be used and the ion concentration adjusted as needed for stabilizing the emulsion under formation conditions. It will be understood that the use of the term "water" in this patent specification, including the appended claims, contemplates that the water may contain other species, such as dissolved minerals or miscible liquids, or the water may contain other suspended materials, all of which may be either naturally present or artificially added. For example, the use of the term water is intended to encompass brine. Thus, the use of such aqueous solutions and/or suspensions is within the scope of the present invention. In one or more embodiments, the present invention is any of the other embodiments described here wherein the second liquid comprises water, usually as the majority component, and the water may contain dissolved ions or other soluble or suspended species.

In one or more embodiments, the SSE, once formed, is exposed to gas at a selected partial pressure of a gas so as to dissolve at least a portion of such gas in the oil in the SSE, thereby forming an SSE having at least a portion of the gas dissolved therein. It is understood that the water within the SSE may also contain dissolved gas, but because of the limited solubility of most gases in water, the amount of gas dissolved in the water is considerably less compared to the amount dissolved in the oil. Further, it will be understood that the gas employed may be a pure gas, a natural mixture of gases, or a specifically composed gas containing fixed amounts of more than one type of gas. In such cases, as is well known to those of ordinary skill, the individual partial pressures of each gas depend on the total gas pressure and the mole fraction of each individual gas. As is also well known to those of ordinary skill, the partial pressure of the gas and the contact time between the gas and the SSE can be selected so as to control the amount of gas that is initially dissolved in the oil. The particular partial pressure selected will depend on the solubility of the gas in the oil, the characteristics of the formation, and the particular objectives discussed below. As is well known, the amount of gas dissolved in the SSE will depend also on the contact time between the gas and the SSE; that is, it will depend on the extent to which the oil component is permitted to become saturated with the gas at the particular partial pressure. However, it is not necessary for the practice of embodiments of the invention that the oil in the SSE be saturated with the gas at the particular partial pressure selected, although it may be. For example, it may be expedient to expose the SSE to a high partial pressure for a short period of time in order to achieve a desired dissolved gas concentration quickly. Under such conditions, saturation may not be achieved. On the other hand, in any of the embodiments disclosed herein, the SSE (or oil phase) may be exposed to a partial pressure of gas and saturated with such gas at the selected partial pressure.

The SSE containing dissolved gas is then injected into the subterranean formation as a drive fluid, and at least a portion of such SSE is placed into one or more areas of the subterranean formation having a pressure sufficiently low to permit evolution of at least a portion of the gas from the oil. Gas bubbles are thereby formed in the oil within the subterranean formation. If the level of formed gas bubbles is sufficiently high, a foamy solids-stabilized emulsion (foamy SSE) will be formed in situ in the formation. Selection of a particular gas partial pressure and exposure time, coupled with knowledge of the subterranean formation pressures, allows control over the volume of dissolved gas that will be released (evolved) from the oil phase to form gas bubbles in the oil within the subterranean formation. As discussed in further detail below, since this volume of gas evolves within the hydrocarbon-filled volume of individual pore spaces within the reservoir rock, the process naturally tends to limit the maximum diameter of the bubbles thus formed in the oil phase within the formation pores, thereby providing a more uniform size distribution of gas bubbles than could be achieved by mechanically mixing gas bubbles in the SSE on the surface prior to injection in the subterranean formation. The foamy SSE formed in situ in the subterranean formation is then used as a drive fluid to drive the hydrocarbons toward one or more production wells where hydrocarbons are produced from the formation.

In the embodiments described thus far, the SSE has been formed first and the gas then added to the SSE prior to injecting the gas-containing SSE into the formation. However, as will be clear to those of ordinary skill, the dissolved gas in the SSE can also be added to one or more of the components of the SSE prior to mixing the components. For example, the desired amount of gas could be dissolved in the oil component of the SSE prior to mixing the SSE. This approach would usually require that the mixing of the oil component and the other components of the SSE be conducted under a pressure sufficient to keep the gas in solution during the mixing process. Under either approach, however, an SSE containing the desired amount of gas (discussed further below) is obtained.

Thus, in one or more embodiments the present invention is a method for producing hydrocarbons from a subterranean formation comprising forming an oil-external emulsion, said oil-external emulsion having water droplets and gas bubbles stabilized therein as internal phases by sub-micron size solid particles, wherein said gas bubbles are grown in situ within said subterranean formation; using said oil-external emulsion in said subterranean formation as a drive fluid to drive said hydrocarbons toward one or more production wells; and recovering said hydrocarbons from said subterranean formation. Accordingly, the oil external emulsion may be formed by dissolving gas in a pre-formed SSE (the dissolved gas being predominantly in the oil phase of the SSE), or the oil-external emulsion may be formed by pre-dissolving the desired amount of gas in, for example, the oil phase and then mixing the oil phase with the other components of the SSE. In either approach, any of the other aspects of the invention described herein may be applied.

The gas bubbles formed and grown in the SSE upon pressure reduction in the formation are stabilized within the emulsion by thin films of water associated with sub-micron solids surrounding the gas bubble at the bubble-oil interface. The stability of the gas bubbles depends on: the size, shape, and composition of the fine solids; the wettability of the surfaces of the solids (either partly or strongly hydrophobic); the presence of sufficient polar hydrocarbons in the oil phase; the concentration of solids; the viscosity of the oil phase; and the size of the bubbles as measured by their mean diameter. In general, stability of the gas bubbles is increased as the solids concentration is increased, as the hydrophobicity of the solids is adjusted to allow the solid surface to be wetted by both oil and water but still maintain an oil-external bubble, as the concentration of polar hydrocarbons in the oil is increased, as oil viscosity is increased, and as the mean gas bubble diameter is reduced. Thus, in one or more embodiments, the present invention comprises any of the embodiments described above or elsewhere in this specification wherein the gas bubbles have a mean diameter below about 50 microns, or below about 40 microns, or below about 30 microns, or below about 20 microns, or below about 15 microns, or below about 10 microns, or below about 5 microns, or below about 2 microns.

While not wishing to be bound by theory, it is believed that forming the gas bubbles and/or foam in situ in the subterranean formation results in a smaller, more uniform gas bubble size due to mass transport limitations that arise in the small pores of the formation. This is believed to occur as follows: when SSE containing dissolved gas fills a particular pore in the formation and expands under reduced pressure, the amount of gas that is available for bubble growth is limited to the dissolved gas present in the SSE contained within that particular pore. Because the SSE injected into the subterranean formation is designed to have lower mobility than other fluids within the reservoir, the injected SSE entering a pore space displaces reservoir fluids to their irreducible saturation. Thus, when SSE displaces reservoir oil and water, the pore space is filled with SSE plus an irreducible reservoir water saturation, which contains negligible dissolved gas content compared to that of the injected SSE. Therefore, because the pore is then isolated from other sources of gas within the formation, the only source of dissolved gas for generation of gas bubbles upon reduction in gas pressure is the gas dissolved in the injected SSE. Thus, the gas bubbles in a particular pore can grow no larger than permitted by the quantity of gas present in the single pore. In this way, the formation of gas bubbles and/or foam is in effect carried out in many, many tiny vessels (the formation pores), each of which produces only small bubbles of about the same size. Further, the diameter of pore throats between connected pores limits the diameter of gas bubbles that will be allowed to pass, breaking larger bubbles into smaller bubbles that will flow through the pore throats. Because the pressure reduction along the path from injection well to production well occurs over numerous individual pores, the reduction in pressure, and hence the extent of bubble growth within an individual pore, is only a small fraction of the total ultimate pressure drop along the path. Thus, this gradual reduction in pressure, combined with the preselected amount of dissolved gas available to form bubbles within the pore space, permits formation of the desired volume fraction of gas bubbles within the SSE that is also naturally conditioned by the pore space and pore throat diameters in a manner to limit the maximum bubble diameter.

The in situ formation of the gas bubbles described above contrasts with the case where the foam and/or gas bubbles are formed in a single, large mixing vessel on the surface. In this situation, all of the gas in the mixing vessel is available to grow any particular bubbles. That is, unlike the bubbles growing within the small confines of the formation pores, any given bubble growing within the mixing vessel has a relatively unlimited supply of gas available to it because the gas from one part of the mixing vessel can readily move through the vessel to reach any of the growing bubbles. Thus, some bubbles grow relatively large, and other bubbles grow smaller, with the result that the mean bubble diameter is larger and the bubble size distribution is broader.

A number of different gases can be added to a solids-stabilized oil-external emulsion to form gas bubbles as a third phase within the oil phase of the emulsion without reducing the volume of water droplets incorporated. Hence, addition of non-condensable gas in an amount that exceeds the solubility limit of the gas in either the oil or water can be used to reduce the volume fraction of oil needed to maintain the emulsion as an oil-external emulsion. The requirement for the added gas is that it not be totally dissolved or condensed within the emulsion at the pressure and temperature of the reservoir. Depending on the PVT thermodynamic properties of the gas-water-oil mixture, some of the added gas may dissolve in the oil and therefore, depending on the composition of the gas, also serve to reduce the viscosity of the oil and the viscosity of the emulsion as disclosed in U.S. Pat. Nos. 5,855,243 and 5,910,467.

Without limiting the scope of possible gases, examples of gases that can be used according to any of the embodiments disclosed herein to form gas bubbles include: light hydrocarbon gases, such as methane, nitrogen, or flue gas (combustion exhaust gas byproduct from steam boilers or gas turbines). Other gases that may be used include carbon dioxide, ethane, or higher carbon number hydrocarbons, noble gases (although expensive) such as helium (He) and argon (Ar), and air and blends of air with nitrogen. Flue gas can be especially beneficial because it usually contains approximately 7-9 volume % carbon dioxide, with the balance being nitrogen plus traces of oxides. Carbon dioxide is much more soluble in the crude oil used to form the external phase of the emulsion than is nitrogen. Therefore, addition of flue gas can be used to provide two benefits simultaneously: (1) formation of the non-soluble (non-condensable) gas phase bubbles by primarily nitrogen, and (2) dissolution of carbon dioxide into the oil phase to reduce its viscosity. To form the gas bubbles, any gas can be used that is not totally soluble in either the hydrocarbon or water phases of the emulsion at the pressure and temperature of the target reservoir application. Obviously, if air is used as the gas, care should be taken to manage any fire or explosion hazards that can arise by having oxygen and oil or other hydrocarbons in contact with one another. That is, inclusion of air in injected emulsions containing hydrocarbons can lead to explosive conditions in surface facilities and wellbores. This hazard is not an issue for inert gases such as nitrogen. On the other hand, addition of oxygen from the air results in oxidation of some of the hydrocarbon molecules to form polar hydrocarbons in the oil. This can be beneficial in increasing the stability of the emulsion if the oil is originally deficient in polar hydrocarbons.

As a general matter, the formation of gas bubbles in the oil phase of SSE's allows reduction in the volume fraction of oil in the emulsion without adversely affecting either the stability of the water droplets within the emulsion or the ability of the emulsion to maintain effective mobility control relative to the formation fluids (oil, water, or gas) being displaced by the injected emulsion. Because the gas incorporated in the emulsion as free bubbles can be inexpensive relative to the oil being replaced in the emulsion, the use of foamy solids-stabilized emulsions allows greater net oil recovery at lower cost. Thus, the overall net oil recovery resulting from flooding processes using SSE containing free gas bubbles can be increased since less oil can be injected in the SSE without adversely affecting the oil displacement efficiency. As used herein, "net oil recovery" is defined as the volume of oil produced from a particular reservoir less the volume of oil injected in the SSE used to recover the produced oil. Further, addition of non-dissolved (i.e. non-condensed) gas as free gas bubbles does not interfere with addition to the oil of dissolvable gas or liquid components (including light hydrocarbons, carbon dioxide, etc.) to the oil to adjust the emulsion viscosity.

However, it is believed that a particular advantage of the present invention lies in the small, uniform gas bubble size obtainable with the in situ formation of gas bubbles and/or foams. For a given volume of gas dissolved in the oil phase, the foamy SSE's of the present invention are expected to have smaller bubbles and more bubbles compared to a foamy SSE that is not generated as described herein. That is, in embodiments of the present invention, the gas is used to make many small bubbles rather than fewer larger bubbles. The smaller, more numerous bubbles of the present invention are expected, from a theoretical standpoint, to result in better stabilization of the water droplets in the foamy SSE. While not wishing to be bound by theory, the protective effect of the gas bubbles is believed to be explainable as follows: the relatively compressible gas bubbles that exist within the oil phase and surround the water droplets provide a cushioning buffer between individual water droplets as the SSE flows through the restrictive pore throats. Shear stress resulting from colliding water droplets at pore throats is believed to be the major contributor to water droplet rupture, and the cushioning effect of the gas bubbles appears to reduce water droplet rupture, and provides an unexpected synergistic benefit to overall SSE efficiency. In the present invention, compared to a foamy SSE not made in situ, because there are numerous, smaller gas bubbles as opposed to fewer larger gas bubbles, each water droplet is expected to be surrounded by and protected by more gas bubbles. Thus, in the present invention, the cushioning buffer described above is expected to be greater and the stability of the foamy SSE is expected to be greater.

These effects are expected, in turn, to result in foamy SSE's that are more stable at higher water contents (i.e., lower oil contents). For example, foamy SSE's having 60 to 70 volume percent water or higher made according to the present invention are expected to be much more stable than foamy SSE's having the same water content but larger, less uniform gas bubble sizes. Alternatively, for a given stability, it may be possible to produce foamy SSE's having even higher water contents (lower oil contents).

Accordingly, as described above, embodiments of the present invention relate to a method for producing hydrocarbons from a subterranean formation comprising forming a solids-stabilized emulsion, said solids-stabilized emulsion comprising oil as a first liquid, droplets of a second liquid suspended in said oil, and natural or added solid particles that are insoluble in both of said oil and said second liquid at the conditions of said subterranean formation; exposing said solids-stabilized emulsion to gas at a selected partial pressure of said gas; dissolving at least a portion of said gas in said oil to form a solids-stabilized emulsion having said gas dissolved therein; injecting said solids-stabilized emulsion having said gas dissolved therein into said subterranean formation as a drive fluid; placing at least a portion of said solids-stabilized emulsion having said gas dissolved therein into one or more areas of said subterranean formation having a pressure sufficiently lower than said first pressure to permit evolution of at least a portion of said gas from said oil, thereby forming gas bubbles in said oil within said subterranean formation; and recovering said hydrocarbons from said subterranean formation. In any of the embodiments described herein, the solids-stabilized emulsion may contain sufficient dissolved gas to decrease the oil content of said solids-stabilized emulsion to within a range of approximately 5% to 40% by volume, or 5% to 35% by volume, or 5% to 30% by volume, 5% to 25% by volume, or 5% to 20% by volume at reservoir flooding pressure. Further, in any of the embodiments described herein, the solids-stabilized emulsion may contain sufficient dissolved gas to decrease the oil content of said solids-stabilized emulsion to a volume percentage falling within a range having a low end point of approximately 5%, 10%, 15%, 20%, 25%, 30%, or 35% and a high end point of approximately 10%, 15%, 20%, 25%, 30%, 35%, or 40%, the high end point always being greater than the low end point, of course. It will be understood, of course, that the volume percentage of oil as described herein represents a percentage of the total emulsion volume.

The maximum volume fraction or volume percentage of gas in the foamy solids-stabilized emulsion is limited by the bubble diameters that will pass through the rock pore throats without rupturing and therefore remain stable during flow, and the maximum working pressure in surface facilities and injection pipelines used to expose the liquid SSE to gas. The second liquid of the SSE may comprise water as the majority component. In any of the above-described embodiments, the gas may be selected from the group consisting of nitrogen, methane, ethane, carbon dioxide, and flue gas, and combinations thereof. The gas selected from such group may be pure or impure, or it can be present in a mixture of gases.

In any of the above-described embodiments, water may be present in any of the amounts taught for the SSE's disclosed in U.S. Pat. Nos. 5,855,243, 5,910,467, 5,927,404, and 6,068,054. Addition of gas bubbles to the SSE's as set forth in embodiments of the present invention will reduce the oil content (volume percentage) of such SSE's (i.e., a portion of the oil phase is replaced by gas bubbles). In any of the above-described embodiments, the hydrocarbons may comprise crude oil and/or the hydrocarbons may comprise natural gas.

In one or more embodiments, the invention comprises the hydrocarbons produced by any of the methods disclosed above or elsewhere herein.

In one or more other embodiments, the inventive method is a method for producing hydrocarbons from a subterranean formation using a foamy solids-stabilized emulsion comprising: forming a solids-stabilized emulsion, said solids-stabilized emulsion comprising an oil phase as an external phase, water as an internal phase, and solid particles that are insoluble in said oil phase and said water at the conditions of said subterranean formation; dissolving a gas in said solids-stabilized emulsion to form a gas-containing solids-stabilized emulsion; injecting said gas-containing solids-stabilized emulsion into said subterranean formation as a drive fluid; placing at least a portion of said gas-containing solids-stabilized emulsion into one or more areas of said subterranean formation having a pressure sufficiently low to permit evolution of at least a portion of said gas from said oil, thereby forming said foamy solids-stabilized emulsion in situ in said subterranean formation; and recovering said hydrocarbons from said subterranean formation.

In one or more embodiments, the invention is any of the above-described embodiments wherein said gas is selected from the group consisting of nitrogen, methane, ethane, carbon dioxide, and flue gas, and combinations thereof. In one or more embodiments, the invention is any of the above-described embodiments wherein said gas is selected from the group consisting of nitrogen, methane, and flue gas, and combinations thereof. In still other embodiments, the invention is any of the above-described embodiments wherein said gas is selected from the group consisting of nitrogen and flue gas, and combinations thereof. In other embodiments, the invention is any of the above-described embodiments wherein said gas is flue gas. In one or more other embodiments, the invention is any of the above-described embodiments wherein water comprises at least sixty volume percent of said solids-stabilized emulsion. In one or more embodiments, the invention is any of the above-described embodiments wherein water comprises at least seventy volume percent of said solids-stabilized emulsion. In one or more embodiments, the invention is any of the above-described embodiments wherein said hydrocarbons comprise crude oil or natural gas.

In still other embodiments, the inventive methods is a method for malting a foamy solids-stabilized emulsion, comprising: forming a solids-stabilized emulsion, said solids-stabilized emulsion comprising oil as a first liquid, droplets of a second liquid suspended in said oil, and solid particles that are insoluble in both of said oil and said second liquid; dissolving a gas in said oil to form a solids-stabilized emulsion having an oil phase comprising dissolved gas; and exposing said solids-stabilized emulsion having an oil phase comprising dissolved gas to a pressure that is sufficiently low to permit evolution of at least a portion of said gas from said oil phase to form gas bubbles in said oil. In one or more embodiments, the invention is any of the above-described embodiments wherein said second liquid comprises water. In one or more embodiments, the invention is any of the above-described embodiments wherein said second liquid comprises water as the majority component. In one or more embodiments, the invention is any of the above-described embodiments wherein said pressurized gas is selected from the group consisting of nitrogen, methane, and flue gas, and combinations thereof. In one or more embodiments, the invention is any of the above-described embodiments wherein water comprises at least about sixty volume percent of said solids-stabilized emulsion or at least about seventy volume percent of said solids-stabilized emulsion.

In yet other embodiments, the inventive method is a method for producing hydrocarbons from a subterranean formation comprising: forming an oil-external emulsion, said oil-external emulsion having water droplets and gas bubbles stabilized therein as internal phases by sub-micron size solid particles, wherein said gas bubbles are formed in situ within said subterranean formation; using said oil-external emulsion in said subterranean formation as a drive fluid to drive said hydrocarbons toward one or more production wells; and recovering said hydrocarbons from said subterranean formation. In one or more further embodiments, the invention is any of the above-described embodiments or other embodiments disclosed herein, wherein said gas bubbles have a maximum diameter that is less than the mean pore throat diameter of said subterranean formation. In one or more embodiments, the invention is any of the above-described embodiments or other embodiments disclosed herein, wherein said gas bubbles have a maximum diameter of about 50 microns or less, or about 40 microns or less, or about 30 microns or less, or about 20 microns or less, or about 15 microns or less, or about 10 microns or less. In still further embodiments, the invention is any of the above-described embodiments or any other embodiments disclosed herein, wherein said oil-external emulsion comprises a sufficient amount of a dissolved gas to reduce the viscosity of said oil-external emulsion to less than about ten times, or less than about five times, or less than about two times the viscosity of said hydrocarbons. In yet further embodiments, the present invention is a method for producing hydrocarbons from a subterranean formation comprising: forming an oil-external emulsion, said oil-external emulsion having water droplets and gas bubbles stabilized therein as internal phases by sub-micron size solid particles, wherein said gas bubbles are formed in situ within said subterranean formation; using said oil-external emulsion in said subterranean formation as a drive fluid to drive said hydrocarbons toward one or more production wells; and recovering said hydrocarbons from said subterranean formation, wherein the volume of oil in said oil-external emulsion is within the range of approximately 5% to 40% by volume, or 5% to 35% by volume, or 5% to 30% by volume, 5% to 25% by volume, or 5% to 20% by volume at reservoir flooding pressure. Further, in any of the embodiments described herein, the volume of oil in said oil-external emulsion may be a volume percentage falling within a range having a low end point of approximately 5%, 10%, 15%, 20%, 25%, 30%, or 35% and a high end point of approximately 10%, 15%, 20%, 25%, 30%, 35%, or 40%, said high end point always being greater than said low end point, of course.

Methods for Making the Inventive Foamy Solids-Stabilized Emulsions

It should be recognized that the emulsion composition should be designed so that the desired volume fraction of free gas bubbles will be present in the emulsion under the anticipated pressure expected within the reservoir during the oil displacement process. Therefore, as the injected emulsion comprising dissolved gas enters the wellbore and flows outward into the reservoir, with subsequent reduction of pressure, the volume fraction of free gas bubbles in the emulsion will increase. Since the pressure within the reservoir varies from injection well sandface to producer well sandface, the volume fraction of free gas bubbles will increase with flowing distance from the injection well. The desired volume fraction of bubbles should therefore be determined for a representative pressure within the reservoir, and that volume and pressure used to determine the mass of non-dissolving gas to be included in the emulsion when the emulsion is exposed to gas at the surface.

The method of making the foamy SSE according to embodiments of the present invention has several other advantages:

(1) Emulsion viscosity near the injection wellbore is lower with a lower volume fraction of free gas bubbles than may be achieved further from the injection wellbore as gas bubbles are generated. This enhances injectivity as a result of lower effective viscosity.

(2) Gas bubbles are generated at a relatively slow rate in the reservoir rock pores within the near-wellbore region around injection wells. This slow growth of bubbles allows time for mass transport of stabilizing species (e.g. mineral solids and associated polar hydrocarbon species) from the oil phase to the gas bubble-oil-water film interface to achieve gas bubble stability.

(3) Because the gas bubbles are grown in the emulsion while within rock pores from gas that is initially dissolved within the oil phase at higher pressure, the maximum size of gas bubbles is better constrained. The amount of gas available for bubble growth is constrained to the amount of gas dissolved within the hydrocarbon phase within that pore, and this is expected to assist in keeping bubble size small and is also expected to enhance bubble stability.

In practicing this method for generating the gas bubbles within the reservoir, a flow restriction choke, or a pressure control valve, can be installed downhole in the injection well to maintain the desired back-pressure on the injected emulsion until it enters the formation. This may prevent loss of pressure and generation of gas bubbles within the injection string and surface flow lines when the well is shut in or when the bottomhole pressure of the injector is lower than the gas bubble point.

In any of the embodiments described above or elsewhere herein, the method for mixing utilizes a multistage mixer wherein a portion of the component can be added in one stage, and additional portions of the same component can be added downstream in one or more stages. Thus, in some embodiments only one portion of the total water to be mixed is added and sheared in the first stage, with the remaining amount of water added later after the first water droplets are sheared and at least partly blended. The same options apply to adding the gas. However, the most economical and practical method for dissolving gas in the emulsion is to first blend the SSE, and then add the desired amount of gas and saturate the SSE by pumping the gas-emulsion mixture to a pressure greater than the saturation pressure. In this manner, the mixer used to blend the water-in-oil emulsion can operate at lower pressure, which reduces cost of mixer seals and thickness of metal housings. However, as noted above, it is not necessary to permit the gas to reach its equilibrium solubility (i.e., to reach saturation) in the SSE.

While the foregoing is directed to embodiments of the present invention, other and further embodiments of the invention may be devised without departing from the basic scope thereof, and the scope thereof is determined by the claims that follow.

We claim:

1. A method for producing hydrocarbons from a subterranean formation comprising:
   forming a solids-stabilized emulsion, said solids-stabilized emulsion comprising oil as a first liquid, droplets of a second liquid suspended in said oil, and solid particles that are insoluble in both of said oil and said second liquid at the conditions of said subterranean formation;

exposing said solids-stabilized emulsion to gas;

dissolving at least a portion of said gas in said oil to form a solids-stabilized emulsion having said gas dissolved therein;

injecting through an injection well said solids-stabilized emulsion having said gas dissolved therein into said subterranean formation as a drive fluid;

placing at least a portion of said solids-stabilized emulsion having said gas dissolved therein into one or more areas of said subterranean formation having an in situ pressure sufficiently low to permit evolution of at least a portion of said gas from said oil, thereby forming a stable emulsion further comprising gas bubbles in said oil within said subterranean formation; and displacing said hydrocarbons to a production well and recovering said hydrocarbons from said subterranean formation.

2. The method of claim 1 wherein said solids-stabilized emulsion contains sufficient gas to decrease the oil content of said solids-stabilized emulsion to within a range of approximately 5 volume percent to 40 volume percent at reservoir in situ pressure without increasing the mobility of said solids-stabilized emulsion to a point approximately greater than the mobility of said hydrocarbons.

3. The method of claim 1 wherein said solids-stabilized emulsion contains sufficient gas to decrease the oil content of said solids-stabilized emulsion to within a range of approximately 5 volume percent to 30 volume percent at reservoir in situ pressure without increasing the mobility of said solids-stabilized emulsion to a point approximately greater than the mobility of said hydrocarbons.

4. The method of claim 1 wherein said solids-stabilized emulsion contains sufficient gas to decrease the oil content of said solids-stabilized emulsion to within a range of approximately 5 volume percent to 20 volume percent at reservoir in situ pressure without increasing the mobility of said solids-stabilized emulsion to a point approximately greater than the mobility of said hydrocarbons.

5. The method of claim 1 wherein said second liquid comprises water.

6. The method of claim 1 wherein said second liquid comprises water as the majority component.

7. The method of claim 1 wherein said gas is selected from the group consisting of nitrogen, methane, ethane, propane, butane, carbon dioxide, natural gas, flue gas, and combinations thereof.

8. The method of claim 1 wherein said hydrocarbons comprise crude oil.

9. The method of claim 1 wherein said hydrocarbons comprise natural gas.

10. The method of claim 1 wherein said oil comprises at least a portion of said hydrocarbons.

11. The method of claim 1 wherein said solid particles are naturally occurring in said oil.

12. The method of claim 1 wherein said gas bubbles at in situ pressure constitute less than 30 volume percent of said solids-stabilized emulsion.

13. The method of claim 1 wherein said gas bubbles at in situ pressure constitute less than 20 volume percent of said solids-stabilized emulsion.

14. The hydrocarbons produced by the method of claim 1.

15. The method of claim 1 wherein said dissolving step comprises saturating said oil with said gas at a selected partial pressure to form a solids-stabilized emulsion having said gas dissolved therein.

16. The method of claim 1 wherein the injection well comprises a downhole flow restriction choke or pressure control valve.

17. The method of claim 1 wherein the one or more areas of said subterranean formation having an in situ pressure sufficiently low to permit evolution of at least a portion of said gas comprises a near-wellbore region around the injection well.

18. The method of claim 1 wherein the one or more areas of said subterranean formation having an in situ pressure sufficiently low to permit evolution of at least a portion of said gas comprises a sandface of the injection well.

19. The method of claim 1 wherein the exposure of the solids-stabilized emulsion to the gas is performed after the solids-stabilized emulsion is formed and after pumping the solids-stabilized emulsion to a pressure greater than the saturation pressure.

* * * * *